United States Patent Office 3,557,146
Patented Jan. 19, 1971

3,557,146
HALOALKYLATION OF ORGANIC COMPOUNDS
Richard F. Heck, Wilmington, Del., assignor to Hercules Incorporated, Wilmington, Del., a corporation of Delaware
No Drawing. Continuation-in-part of applications Ser. No. 479,665, Aug. 13, 1965, Ser. No. 520,677, Jan. 14, 1966, and Ser. No. 659,899, Aug. 11, 1967. This application Jan. 2, 1968, Ser. No. 694,871
Int. Cl. C07c 17/02, 25/14; C07d 63/12
U.S. Cl. 260—332.5      12 Claims

ABSTRACT OF THE DISCLOSURE

Organometallic compounds of the formula QM'X, where Q is the organo group, M' is a Group VIII metal, and X is an anion, react with ethylenic compounds in the presence of cupric halide, preferably at least about 1 molar in concentration, to produce a beta-organoethyl halide therefrom.

---

This is a continuation-in-part of applications Ser. No. 479,665 filed Aug. 13, 1965, Ser. No. 520,677 filed Jan. 14, 1966, now abandoned, and Ser. No. 659,899 filed Aug. 11, 1967.

In said parent applications there are described processes in which ethylenic compounds are reacted with organometallic compounds of Group VIII metals. These reactions are made catalytic with respect to the Group VIII metal by use of a redox component which regenerates the Group VIII metal and provides basis for its reuse.

In the special case where cupric halide is used as the redox component, the use of more than is necessary for a simple redox causes a side reaction to take place, which side reaction is the subject of the present invention.

In accordance with the present invention, it has now been found that an olefin of the formula $$\begin{matrix} R \\ \diagdown \\ \phantom{R}\phantom{=}\phantom{R} \\ \diagup \\ R \end{matrix} C=C \begin{matrix} R \\ \diagup \\ \phantom{R}\phantom{=}\phantom{R} \\ \diagdown \\ R \end{matrix}$$

when contacted at a temperature in the range of 0–150° C. with an organometallic compound of the formula QM'X and $CuX_2$ reacts to produce a compound of the formula

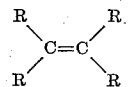

where M' is a group VIII metal, X is chlorine or bromine, the R groups are selected from the classes consisting of (a) hydrogen,
(b) alkyl, cycloalkyl, halosubstituted alkyl or cycloalkyl in which the halogroup is separated from the carbon of attachment in said R group by at least one carbon, aralkyl, aryl, alkaryl, haloaralkyl, haloaryl and haloalkaryl wherein the halogroup is in the aryl ring.
(c) —CHO, —COOH, —COO alkyl, —CO alkyl, —CON (alkyl)$_2$, —NO$_2$, —CN,
(d) substituted alkyl, cycloalkyl, aralkyl, aryl, or alkaryl containing as the substituent a member of class (c),
(e) two R groups taken in combination to form a bivalent saturated hydrocarbon group having 1, 2 or 3 carbons in the shortest chain between carbons of attachment to the ethylenic carbons, the total carbon in any R group being 10 and at least two of said R groups are hydrogen;

the Q group being selected from the group consisting of radicals of the formula

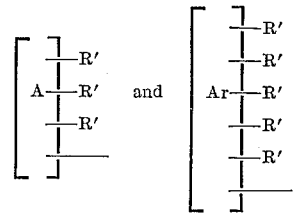

where A is an unsubstituted thiophene ring and Ar is an unsubstituted hydrocarbon group containing an aromatic ring or a benzothiophene group and the R' groups are the same or different and are hydrogen, halogen, nitro, alkoxy, alkyl, lower dialkylamino, lower alkanoamido, lower alkoxy, lower carboalkoxy, lower alkanoyl, carboxy, hydroxy, formyl or M'X. Preferably the maximum number of any R' group is 5 for hydrogen, 4 for $C_1$–$C_3$ alkyl, 3 for $C_4$–$C_{10}$ alkyl, halogen, 2 for nitro, lower alkoxy, lower alkylamino, lower alkanomido, lower alkanoyl, carboxy, hydroxy, formyl, M'X, lower carboalkoxy. The [Ar] [R']$_5$ group is preferably limited in size to a total of 20 carbons and the R' groups are preferably limited in size to a total of 10 carbons each.

It is thought that an adduct of the formula

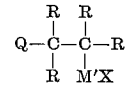

is an in..rmediate, which forms in a first step from the olefin and the organometallic compound QM'X, and that the adduct subsequently reacts with the copper salt to produce the compound of the formula

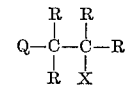

The adduct is capable of either undergoing cleavage as in said copending applications Ser. Nos. 479,665 and 659,899 or undergoing reaction with cupric halide. These are competitive reactions and the former, being a first order reaction is independent of the concentration, while the latter, being a second order reaction, is favored by an increase of concentration of the copper halide. The reactions of the present invention is, accordingly, favored by a high concentration of cupric halide. Moreover, since cupric halide is reduced, not only in the replacement reaction, but also in oxidizing the Group VIII metal to its higher valence state, it is preferable to reoxidize the copper during the course of the reaction. Alternatively, fresh cupric halide may be added to maintain the concentration of cupric salt. In either case a sufficient cupric halide concentration is maintained during the reaction so that the reaction of the present invention predominates over the cleavage reaction. A concentration of the cupric halide in the reaction mixture which is satisfactory is about a 1-molar cupric halide reaction mixture. It is preferred to use higher than 1-molar with the upper limit being that of a saturated solution with respect to cupric halide.

In the reaction of this invention the Group VIII metal organometallic compound has been indicated by the formulas showing the course of the reaction as being required in molecular amounts. However, this is not necessarily the case, since the Group VIII metal organometallic compound is produced in situ, for example, from a palladium salt and a Group II organometallic compound, and the palladium salt is regenerated by reaction with the cupric salt. In order to carry out the reaction using a catalytic amount of Group VIII metal, the Group VII organometallic compound is used in molecular amounts, and the reaction then proceeds catalytically with respect to the Group VIII metal. This is particularly desirable in the case of expensive metals such as palladium. When the reaction is carried out catalytically with respect to the Group VIII metal, the compound QM'X is present in only small amounts and the intermediate adduct of the olefin and QM'X is likewise present in only small amounts and the reaction depends on the rapid completion of each of the stepwise reactions with reuse of the Group VIII metal salts.

In carrying out the process of this invention the adduct is produced by reacting the organometallic compound of the formula QM'X with an olefinic compound of the formula

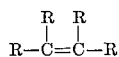

The organometallic compound QM'X is a compound of relatively short life at ordinary temperatures and is, therefore, produced in the presence of the olefin to which it is to add or it is produced at low temperatures where it is stable. The adduct of QM'X and said olefinic compound which has the formula

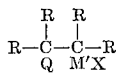

is likewise unstable and it is either prepared in the presence of the cupric halide with which it reacts or it is prepared at a temperature below about 0° C. and then is reacted with the cupric halide.

The addition of QM'X to the olefin takes place at low temperatures even below 0° C., and the adduct is stable at low temperatures. At temperatures above about 0° C. the cupric chloride reacts. If cupric chloride is absent, the cleavage of M'HX would be the normal reaction and some of this normal reaction may take place even in the presence of cupric chloride. If there are no hydrogen atoms in the adduct for such cleavage, RM'X or QM'X may be formed by the cleavage reaction in the absence of cupric chloride. Temperatures up to about 200° C. are used for completion of the reaction with the cupric chloride. The reaction temperatures may thus be varied during the steps of reaction. The preferred reaction temperature range is from about 0° C. to about 150° C.

The organometallic compound QM'X of the Group VIII metal is produced by reaction of a Group VIII metal salt with an organometallic compound of a metal of another group designated by the formula M for the metal. The latter organometallic compound may be any of the types QM, $Q_2M$, $Q_3M$, $Q_4M$, QMX, $QMX_2$, $QMX_3$, $Q_2MX_3$, $Q_2MX_2$, $Q_3MX$ depending on the metal and its valence. Using QMX as an example, the reaction for formation of QM'X may be written as follows:

$$QMX + M'X_2 \rightarrow QM'X + MX_2$$

If the valence of M and M' are other than II, corresponding equations for other valences of the metal may be written.

There are compounds having more than one organometallic group per Q unit, in which cases, more than one may react. Such a reaction is expressed as follows:

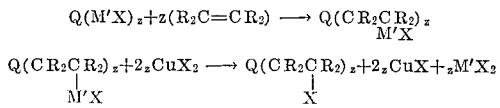

in which z is a whole number from 1 to 3.

The following reactions are believed to be involved in various aspects of this invention:

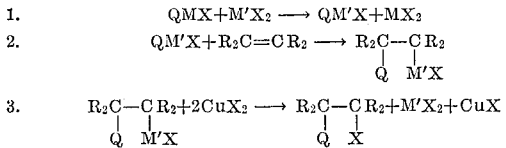

Each of these may be carried out separately or in combination. Reaction 1 for instance is frequently carried out in the presence of the olefin to effect as a subsequent reaction Reaction 2. This will be particularly desirable to avoid decomposition of the organometallic compound QM'X after it is prepared. Reaction 2 may also be carried out in the presence of $CuX_2$ so as to effect Reaction 3 as a subsequent reaction. Likewise, all three reactions can be carried out in the same reaction medium as a sequence of reactions which take place together. Reaction 1 is, in general, known in the art. Reaction 2 is a reaction disclosed in the parent application Serial No. 479,665 and Reaction 3 is the essential reaction of this invention.

The organometallic compounds QMX which are used to prepare the organometallic compounds of the Group VIII metal may be those of metals of Groups I-A, II-A, II-B, III-A, and IV-A. Many of these are reactive with air and water and require special precautions. The organometallic compounds of mercury, lead and tin are of particular interest since they do not require such special precautions. The organometallic compounds of mercury are especially interesting since they are readily produced from a wide variety of compounds and provide means for introducing a wide variety of Q groups. Moreover, the organometallic compound of the Group VIII metal can be produced from the organomercury compound in situ and in the presence of the copper salt so that the reaction becomes catalytic with respect to the Group VIII metal. This may be expressed by the following equation:

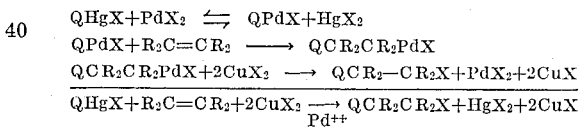

In the process of this invention the cuprous halide produced may be oxidized back to the cupric halide level. This is effected in the presence of hydrochloric or hydrobromic acid and oxygen and may be carried out separately from the main reaction.

The preparation of QM'X from QMX is carried out in a solvent which does not react with QMX or QM'X and this will be variable depending on the organometallic compounds and their various reactivities. If QMX is one of the organometallic compounds which is highly active like the organomagnesium compounds, the solvent must be free of water and compounds or functional groups which have active hydrogen, carbonyl groups of various types, nitrile groups, and the like. The reactivities of these organometallic compounds with such groups is well known. The solvent is inert when it does not react with the organometallic compound used and the term is thus variable according to which ones are involved. After QM'X is prepared, the solvent may be changed or other solvents which do not react with QM'X may be added. For illustration, ethers may be used as solvents in the preparation of an organometallic compound of the Group VIII metal from an organomagnesium compound, but after the reaction whereby QM'X is produced, an alcohol, acetonitrile or water may be introduced. The reaction of M'X with the olefin to produce the adduct may be carried out in such solvents as methanol, ethanol, acetone, acetonitrile, ethyl acetate, benzene, toluene, pentane, cyclohexane, diethyl ether or dioxan, and water may be present. These same solvents are useful as solvents in the reaction with $CuCl_2$.

Olefinic compounds which undergo the process of this invention are compounds of the formula

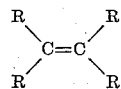

where the R groups are the same or different and at least two are hydrogen and are selected from the groups indicated hereinabove and are exemplified by hydrogen, methyl, ethyl, propyl, isopropyl, butyl, isobutyl, sec-butyl, t-butyl, pentyl, isopentyl, sec-pentyl, t-pentyl, hexyl, isohexyl, sec-hexyl, t-hexyl, heptyl, isoheptyl, sec-heptyl, t-heptyl, octyl, sec-octyl, isooctyl, nonyl, isononyl, decyl, isodecyl, sec-decyl, cyclohexyl, cyclopentyl, methylcyclopentyl, phenyl, tolyl, benzyl, bornyl, norbornyl, napthyl, β-chloroethyl, p-chlorophenyl, bromophenyl, chlorotolyl, iodobenzyl, carboxymethyl, carboxyphenyl, carbomethoxy phenyl, acetomethyl, acetophenyl, nitrophenyl, nitrotolyl, diethylcarboxamidophenyl, fluorocyclohexyl, chloromethylcyclopentyl, chloropentyl, cyanophenyl, cyano, carboxy, carbomethoxy, carbethoxy, N,N-diethylcarbamyl, acetyl, butyryl, benzoyl, toluyl, nitro, and formyl. The useful olefins containing these R groups are exemplified by ethylene, propylene, butene-1, butene-2, isobutylene, pentene-1, pentene-2, 2-methylbutene-1, 3-methylbutene-1, hexene-1, hexene-2, hexene-3, 2-methylpentene-1, 3-methylpentene-1, 4 - methylpentene - 1, 4-methylpentene-2, heptene-1, heptene-2, heptene-3, 2-methylhexene-1, 3 - methylhexene-1, 4-methylhexene-1, 5-methylhexene-1, 2-ethylpentene-1, 3-ethylpentene-1, 4-ethylpentene-1, 2,3-dimethylpentene-1, 3,4 - dimethylpentene-1, 2,4-dimethylpentene-1, 2-propylbutene-1, 2-isopropylbutene - 1, 3 - propylbutene - 1, 3 - isopropylbutene-1, 4 - methylhexene - 2, 5 - methylhexene - 2, 3,4 - dimethylpentene - 2, 3,5 - dimethylpentene - 2, 4,4-dimethylpentene - 2, 4,5 - dimethylpentene-2, octene-1, octene - 2, octene - 3, octene - 4, nonene - 1, nonene - 2, nonene-3, nonene-4, nonene-5, decene-1, dodecene-1, cyclopentene, bornylene, norbornene, cyclohexene, indene, β-pinene, α-fenchene, β-fenchene, camphene, dihydrodipentene, styrene, stilbene, p-methylstyrene, α-methylstyrene, α-methyl - p - methylstyrene, allylbenzene, allylnaphthalene, vinylnaphthalene, β-vinylethyl chloride, p-chlorostyrene, acrolein, crotonaldehyde, cinnamaldehyde, acrylic acid, crotonic acid, isocrotonic acid, α-methylacrylic acid, oleic acid, undecylenic acid, 3-butenoic acid, cinnamic acid, and esters of these acids and methyl and ethyl alcohol or glycol or glycerol, 3-butenone and benzalacetone, N,N-diethylacrylamide, N,N-diethyloleamide, nitroethylene, nitropropylene, o - nitrobenzalacetone, m-nitrocinnamic acid, p-allylbenzoic acid, m - allylbenzoic acid, m-allyl-p-toluic acid, m-or p-carbomethoxystyrene, m-nitrostyrene, m- or p-carboxystyrene, m- or p-vinylbenzaldehyde, acrylonitrile, α-methylacrylonitrile and crotononitrile.

The organometallic compounds used in preparing the intermediate adduct of the formula QM'X includes those in which Q is

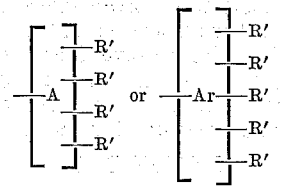

as indicated above and the R' groups have been defined so as to include the —M'X group so that the organometallic compounds may have more than one M'X group. In the case that the QM'X compound is produced by reaction of M'X$_2$ with the QMX compound the R' group of that QMX compound may also be a MX group which is replaced by M'X in the reaction of the QMX with M'X$_2$.

The QM'X groups are further exemplified by those in which R' in the general formulas above is methyl, ethyl, propyl, isopropyl, butyl, and other isomeric alkyls up to C$_{10}$ alkyls having any of the isomeric configurations of such alkyl radicals, and the alkyl groups in the alkyl containing groups of R' such as the alkoxy, alkyl, lower dialkylamino, lower alkanoamido, lower alkoxy, lower carboalkoxy and lower alkanoyl likewise include alkyls of any isomeric configuration of such groups. The halogens which R' represents are exemplified by bromine, chlorine, iodine and fluorine. In the case where the QM'X compound is produced in situ from a QMX compound, where M is Hg, the QHgX compound is thus exemplified by the following;

A compounds (where A represents a thiophene ring):

2-chloromercurithiophene,
2,5-di(chloromercuri)thiophene,
2-chloro-5-chloromercurithiophene,
2-methyl-5-chloromercurithiophene,
2,4-dimethyl-5-chloromercurithiophene,
2-ethyl-5-chloromercurithiophene,
3-methyl-2,5-di(chloromercuri)thiophene,
2-nitro-5-chloromercurithiophene,
3,4-dimethyl-2,5-di(chloromercuri)thiophene,
3-chloromercurithiophene-5-carboxylic acid.

Ar compounds (where Ar represents an aromatic ring nucleus): phenyl, biphenyl (φ—φ—), naphthyl, phenanthryl, anthracyl, tetrahydronaphthyl and the benzothiophene ring and in these cases the QMX compounds which form the corresponding QM'X compounds are exemplified by the following compounds:

φHgCl, ClHgφ(OC(O)CH$_3$)CHO, (CH$_3$O)φHgCl,
(CH$_3$O)$_2$φHgCl, ClφHgCl, Cl$_2$φHgCl, BrφHgCl,
Br$_2$φHgCl, FφHgCl, F$_2$φHgCl, Cl(CH$_3$O)φHgCl,
Br(CH$_3$O)φHgCl, F(CH$_3$O)φHgCl, NO$_2$)φHgCl,
(NO$_2$)$_2$φHgCl, alkyl OC(O)φHgCl, (C$_2$H$_5$)$_2$NφHgCl,
CH$_3$C(O)NHφHgCl, HOφHgCl, (HO)$_2$φHgCl,
(alkyl-O)φHgCl, (alkyl-O)$_2$φHgCl, CH$_3$C(O)OφHgCl,
CH$_3$C(O)Oφ(COOH)HgCl, φC(O)φHgCl,
HOOCφHgCl, (CHO)φHgCl, CH$_3$φHgCl, (CH$_3$)$_2$φHgCl,
(CH$_3$)$_3$φHgCl, (CH$_3$)φ(HgCl)$_2$, (CH$_3$)$_2$φHgCl$_2$,
(CH$_3$)$_3$φ(HgCl)$_2$, ClHgφ(OH)CHO,
ClHgφ(COOalkyl), ClHgφ(COOalkyl)$_2$,
φ—φ—HgCl)(φ—φ)(HgCl)$_2$, ClHgφ(CH$_2$)$_4$,
ClHg(φ)(SCH=CH), C$_{10}$H$_7$HgCl, C$_{18}$H$_{10}$HgCl,
phenanthryl mercuric chloride anthracyl mercurie chloride, tetrahydronaphthyl mercuric chloride and benzothienyl, naphthyl, phenanthryl and anthracyl compounds corresponding to the various listed phenyl compounds.

The Group VIII metals which are operable in this process are: iron, cobalt, nickel, ruthenium, rhodium, palladium, osmium, iridium or platinum. Iron is of particular interest because of its comparative cheapness. Palladium is the preferred Group VIII metal.

The process of this invention is illustrated by the following examples.

EXAMPLE 1

A mixture of 15.7 g. (50 mmoles) phenylmercuric chloride, 2.1 g. (50 mmoles) lithiumchloride and 13.4 g. (100 mmoles) cupric chloride was placed in a pressure bottle. Air was displaced by ethylene and 40 g. acetic acid, 5 g. water and 5 ml. 0.1 molar Li$_2$PdCl$_4$ in acetic acid were added. Ethylene was then added to 30 p.s.i. and the mixture was stirred for 16 hours. The resulting solution was analyzed by gas chromatography whereby the product solution was shown to be 0.755 molar in 2-phenethyl chloride and 0.16 molar in styrene. Three such reactions were carried out and the products distributed between pentane and water. From the pentane was recovered by distillation 13.2 G.P.P. 105–115° C./41 mm. which analyzed 95% pure 2-phenethyl chloride which is about 69% of the theoretical yield.

EXAMPLE 2

A mixture of 3.57 g. phenylmercuric bromide, 2.24 g. cupric bromide and 0.87 g. lithium bromide was placed in a pressure bottle with ethylene. To this was added 7 g. acetic acid, 1 g. water and 1 ml. 0.1 molar slurry of palladium nitrate in acetic acid. Ethylene was added to bring the pressure up to 30 p.s.i. and the mixture was stirred for 16 hours. Analysis by gas chromatography showed the solution to be 0.135 molar in 2-phenethyl bromide which is 13.5% of theory. Bromobenzene was a byproduct.

EXAMPLE 3

Example 1 was repeated using propylene in place of ethylene. From a combination of three runs there was obtained 17 g. product boiling in the range of 59–160° C./6 mm. which analyzed about 33% propenylbenzene and 67% 1-phenyl-2-propylchloride. The propenylbenzene fraction separated by chromatography analyzed 91.16% C. and 9.06% H. The 1-phenyl-2-propylchloride fraction analyzed 69.97% C; 7.63% H; 23.0% Cl, and the NMR spectrum confirmed the structure.

EXAMPLE 4

A mixture of 3.63 g. 2-naphthylmercuric chloride, 0.42 g. lithium chloride, 1.34 g. cupric chloride, 7 g. acetic acid, 1 g. water, and 1 ml. 0.1 molar $Li_2PdCl_4$ in acetic acid was reacted 16 hours with ethylene at 30 p.s.i. and the product was distributed between water and methylene chloride. From the methylene chloride was obtained 0.57 g. 2-naphthylethyl chloride M.P. 46.5–47.5° C. which was 30% of theory Further crystallzation from pentane gave a purer product M.P. 47–47.5° C. which analyzed 74.98% C, 5.99% H and 18.8% Cl. The NMR spectrum confirmed the structure.

EXAMPLE 5

A mixture of 3.57 g. p-chloromercuribenzoic acid, 0.42 g. lithium chloride, 1.34 g. cupric chloride, 8 g. acetic acid, 1 g. water and 1 ml. 0.1 molar $Li_2PdCl_4$ in acetic acid was stirred 16 hours under 30 p.s.i. ethylene. The product was distributed between methylene chloride and water and recovered from the methylene chloride as 1.33 g. colorless crystals which melted at 200–201° C. Crystallization from aqueous methanol did not change the melting point. The analysis of 58.88% C; 5.21% H; 19.15% Cl confirmed the product to be p(2-chloroethyl(benzoic acid. The yield was 72% of theory.

EXAMPLE 6

A mixture of 15.95 g. (50 mmole) 2-chloromercurithiophene, 13.4 g. (100 mmole) cupric chloride, 2.1 g. (50 mmole) lithium chloride, 40 g. acetic acid, 5 g. water and 5 ml. 0.1 molar $Li_2PdCl_4$ in acetic acid was stirred 16 hours under 30 p.s.i. ethylene. Three such preparations were carried out and combined. The product was separated by methylene chloride extraction and distilled to obtain 3.2 g. 2-thienylethyl chloride which boiled at 69–70° C. at 7 mm. The yield was 13% of theory.

EXAMPLE 7

A mixture of 15.7 g. (50 mmoles) phenylmercuric chloride, 26.8 g. (200 mmoles) cupric chloride, 2.1 g. (50 mmoles) lithium chloride, 35 g. acetic acid, 4.2 g. acrolein, 5 g. water, and 5 ml. 0.1 molar $Li_2PdCl_4$ in acetic acid was held at about 0° C while combining the ingredients and was then stirred at about 25° C. for 16 hours. From this mixture was isolated a distillable product (18.3 g.) boiling in the range of 80–101.5° C./7.5 mm. which was purified as the sodium bisulfite adduct and then redistilled. B.P. 101° C./7.5 mm. The distilled 2-chloro-3-phenylpropionaldehyde analyzed 63.99% C; 5.72 H; 21.6% Cl. The structure was confirmed by the NMR spectrum.

EXAMPLE 8

A mixture of 1.9 g. (5 mmoles) p-chloromercuridiethylaniline, 0.21 g. (5 mmoles) lithium chloride, 1.34 g. (10 mmoles) cupric chloride, 8 g. acetic acid, 1 g. water, and 1 ml. 0.1 molar $Li_2PdCl_4$ in acetic acid was stirred 16 hours at 25° C. under ethylene at 30 p.s.i. The product was separated by distribution between water and methylene chloride and recovery from the methylene chloride. About 0.2 g. liquid 2-(p-diethylaminophenyl)ethyl chloride (20% of theory) was recovered. It analyzed 67.62% C.; 8.79% H and 15.8% Cl. The structure was verified by the NMR spectrum.

EXAMPLE 9

A mixture of 7.2 g. (20 mmoles) m-chloromercurinitrobenzene, 5.36 g. (40 mmoles) cupric chloride, 2.68 g. (20 mmoles) lithium chloride, 16 g. acetic acid, 2 g. water, and 1 ml. 0.1 molar $Li_2PdCl_4$ in acetic acid was stirred at 24° C. for 16 hours under 30 p.s.i. ethylene. The resulting solution was shown by gas chromatography to be 0.5 molar in m-nitrophenethyl chloride corresponding to a 47% of theoretical yield. By distillation 2.3 g. m-nitrophenethyl chloride boiling range 95–145° C./4.5 mm. was recovered. After crystallization from a benzene-hexane mixture, it melted at 28–29° C. and analyzed 51.48% C; 4.67% H, 19.7% Cl. The structure was verified by the NMR spectrum.

EXAMPLE 10

A mixture of 3.6 g. (10 mmoles) p-choromercuribenzoic acid, 0.42 g. (10 mmoles) lithium chloride, 1.34 g. (10 mmoles) cupric chloride, 7 g. acetic acid, 1 g. water, 1 g. 2:2:1-bicycloheptene and 1 ml. 0.1 molar $Li_2PdCl_4$ in acetic acid was stirred for 16 hours at 24° C. The product was recovered by extraction with methylene chloride and crystallization from aqueous methanol. The yield was 0.11 g. solid and the melting point of the purified product was 226–227.5° C. (4% of theoretical yield). The product, probably 7-p-carboxyphenyl-2-chloro-2:2:1-bicycloheptane, was further characterized by its carboxyl absorption in infrared at 1695 cm.$^{-1}$ and its analysis: 67.02% C, 6.43% H, 14.9% Cl.

EXAMPLE 11

A mixture of 3.6 g. (10 mmoles) phenylmercuric chloride, 0.42 g. (10 mmoles) lithium chloride, 2.7 g. (20 mmoles) cupric chloride, 7 g. acetic acid, 0.8 g. methyl vinyl ketone, 1 g. water and 1 ml. 0.1 molar $Li_2PdCl_4$ in acetic acid was stirred at 24° C. for 16 hours. Analysis by gas chromatography showed the resulting solution to be 0.8 molar in 1-phenyl-2-chloro-3-butanone and 0.2 molar in benzalacetone. The product was separated by methylene chloride extraction, the benzalacetone was oxidized with potassium permanganate and its oxidation products were removed leaving a crude 1-phenyl-2-chloro-3-butanone whose NMR spectrum in deuterochloroform at 60 megacycles showed bands at −131 (singlet of relative intensity 3 from the methyl group), at −189 (AB part of ABX spectrum, AB=14; AX=8; BX=6.5 with relative intensity 2 from the benzyl methylene group) at −261 quartet, AX=8, BX=6.5 with relative intensity 1 from the ClC—H group) and at −429 c.p.s. (a singlet of relative intensity 5 from the aromatic protons) with respect to tetramethyl silane as the internal standard.

EXAMPLE 12

A mixture of 3.6 g. (10 mmoles) of p-chloromercuribenzoic acid, 2.68 g. (20 mmoles) cupric chloride, 0.42 g. (10 mmoles) lithium chloride, 1 g. water, 7 g. acetic acid, 0.8 g. methyl vinyl ketone and 1.0 ml. 0.1 molar $Li_2PdCl_4$ in acetic acid was stirred at 24° C. for 16 hours and the product was extracted with methylene chloride. The 1-p-carboxyphenyl-2-chloro-3-butanone thus isolated was a solid amounting to 0.64 g. which after crystallization from a benzene-hexane mixture melted at 133–133.5 and analyzed 58.81% C, 5.36% H and 15.8% Cl.

EXAMPLE 13

Using the procedure of Example 12 there was obtained from the reaction of phenylmercuric chloride and norbornene a 5.7% yield of 7-phenyl-2-chloro-2:2:1-bicycloheptane (probably) as a colorless solid M.P. 47.5–48° C.

EXAMPLE 14

Using the procedure of Example 12 there was obtained from the reaction of chloromercurimesitylene and ethylene at 30 p.s.i. (40° C.) at 1.9% yield of 2-chloroethylmesitylene M.P. 56–56.5° C.

EXAMPLE 15

Using the procedure of Example 12 there was obtained from the reaction of bis(acetoxymercuri)mesitylene and ethylene at 30 p.s.i. (24° C. for 16 hours and 50° C. for 2 hours) an 0.8% yield of 2,4-bis(2-chloroethyl)mesitylene M.P. 115.5–116.5°. By gas chromatography the presence of traces of mono-2-chloroethylmesitylene was detected.

EXAMPLE 16

A mixture of 3.13 g. (10 mmoles) phenylmercuric chloride, 0.42 g. (10 mmoles) lithium chloride, 2.68 g. (20 mmoles) cupric chloride, 8 ml. acetic acid, 1 ml. water and 1.0 ml. of 0.1 M ferric chloride in acetic acid solution was stirred under 30 p.s.i. of ethylene for 24 hours. There was obtained a 3.3% yield of 2-phenethyl chloride as a product.

EXAMPLE 17

A mixture of 1.1 g. (2.5 mmoles) tetraphenyl tin, 2.68 g. (20 mmoles) cupric chloride, 0.42 g. (10 mmoles) lithium chloride, 7 g. acetic acid, 1 g. water and 1 ml. 0.1 molar $Li_2PdCl_4$ in acetic acid was stirred 48 hours at 24° C. under 30 p.s.i. of ethylene and phenethyl chloride was recovered in quantitive yield.

The compounds of this invention are useful as products of commerce and as intermediates for the production of unsaturated polymerizable compounds which form resins. The dehydrohalogenation of the B-haloethyl compounds of this invention is a well known method of producing unsaturated substances which form homopolymers when polymerized alone or copolymers when polymerized with such vinyl compounds as styrene, ethylene, acrylic acid, methyl methacrylate and the like. A full disclosure of the dehydrohalogenation of B-haloethyl compounds indicating the wide variety of groups that may be in the resulting unsaturated compounds which find use as polymer formers is to be found in Vinyl and Related Polymers, by Schildknecht, John Wiley & Sons, Inc., 1952 (see chapter 3).

The olefinic compounds produced by dehydrohalogenation of the compounds of this invention are reactive with O,O-dimethyl phosphorodithioic acid when contacted herewith in the presence of a free radical generator, i.e., u.v. light and the O,O-dimethyl phosphorodithioates of these compounds produced thereby are toxic to a variety of insects and thus are also useful in the production of insecticides.

What I claim and desire to protect by Letters Patent is:

1. The process which comprises contacting olefinic compounds of the formulae RCH=CHR and $R_2C$=$CH_2$ at a temperature in the range of 0° to about 200° C. with $CuX_2$ and an organometallic compound of the formula QM'X whereby compounds of the formulae

QRCH—CHRX and $QR_2C$—$CH_2X$ are produced and wherein:

(1) X is chlorine or bromine,
(2) M' is a Group VIII metal,
(3) one of the R's may be a nonhydrocarbon substituent selected from the group consisting of —CHO, —COOH, —NO$_2$, —CN, —CO phenyl, —CO tolyl, —CO alkyl, —COO alkyl, and —CON (alkyl)$_2$, wherein the alkyl contains 1 to 3 carbon atoms, or
(4) one or both R's may be hydrogen, a hydrocarbon group containing 1 to 10 carbon atoms selected from the group consisting of alkyl, cycloalkyl, alkaryl, aryl, and aralkyl, or such a hydrocarbon group substituted with halogen or one of the nonhydrocarbon substituents of (3), or
(5) both R's taken in combination with each other and one or both of the ethylenic carbons form an ethylenic compound containing a cyclic structure with only one ethylenic double bond and no other aliphatic unsaturation, said compound containing 5 to 10 carbon atoms, and
(6) Q may be a thienyl, benzothienyl or aryl group, said aryl group containing 6 to 14 carbon atoms in the ring system, or may be one of said groups substituted with a substituent selected from the group consisting of alkyl groups containing 1 to 10 carbon atoms, halogen, —NO$_2$, —OH, M'X, —CHO, —COOH, —COO alkyl, —OC alkyl, —NCHO alkyl, —N(alkyl)$_2$ and —O alkyl, wherein the alkyl contains 1 to 3 carbon atoms.

2. The proces of claim 1 in which M' is Pd and the QPdX is formed by reaction of QHgX with PdX$_2$ or a complex thereof.

3. The process of claim 2 in which Q is phenyl and the olefinic compound is ethylene.

4. The process of claim 2 in which Q is phenyl and the olefinic compound is propylene.

5. The process of claim 2 in which Q is naphthyl and the olefinic compound is ethylene.

6. The process of claim 2 in which Q is carboxyphenyl and the olefinic compound is ethylene.

7. The process of claim 2 in which Q is theinyl and the olefinic compound is ethylene.

8. The process of claim 2 in which Q is diethylaminophenyl and the olefinic compound is ethylene.

9. The process of claim 2 in which Q is nitrophenyl and the olefinic compound is ethylene.

10. The process of claim 2 in which Q is mesityl and the olefinic compound is ethylene.

11. The proces of claim 2 in which Q is phenyl and the olefinic compound is norbornene.

12. The process of claim 2 in which the QPdX is formed in situ in the reaction mixture.

References Cited

UNITED STATES PATENTS 3,462,453   8/1969   Popoff et al. _____ 260—332.5
3,426,035   2/1969   Bremmer _____ 260—297

HENRY R. JILES, Primary Examiner

C. M. SHURKO, Assistant Examiner

U.S. Cl. X.R.

260—330.5, 332.2, 332.3, 429, 439, 464, 465, 465.7, 468, 469, 487, 514, 515, 526, 557, 558, 561, 563, 576, 577, 583, 598, 599, 601, 612, 617, 619, 623, 633, 644, 646, 648, 649, 650, 651, 659

PO-1050
(5/69)

UNITED STATES PATENT OFFICE
CERTIFICATE OF CORRECTION

Patent No. 3,557,146          Dated January 19, 1971

Inventor(s) Richard F. Heck

It is certified that error appears in the above-identified patent and that said Letters Patent are hereby corrected as shown below:

Col. 2, line 22 of printed patent, "alkanomido" should read --alkanoamido--

Col. 2, line 48 of printed patent, "reactions" should read --reaction--

Col. 3, line 27 (formula) of printed patent, $$\begin{array}{c} R\ R \\ |\ \ | \\ R-C-C-R \\ |\ \ | \\ Q\ M'X \end{array} \quad \text{should read} \quad \begin{array}{c} R\ R \\ |\ \ | \\ R-C-C-R \\ |\ \ | \\ Q\ M'X \end{array}$$

Col. 3, line 64 of printed patent, after "written." the follwing sentence should be inserted --For exa when the valence of M' is three, as in ferric chloride, the organometallic compound produced the above reaction will be $QM'X_2$.--

Col. 4, line 70 of printed patent, "M'X" should read --QM'X--

Col. 5, line 21 of printed patent, "cyanophenyl" the word --cyanomethyl- should be inserted Col. 6, line 36 of printed patent, "$NO_2)\emptyset HgCl$," should read --$(NO_2)\emptyset HgCl$,--

Col. 6, line 42 of printed patent, "$(CH_3)_2\emptyset HgCl_2$" sho read --$(CH_3)_2\emptyset(HgCl)_2$--

Col. 6, line 45 of printed patent, ")" after the first HgCl should be removed and replaced with a com

UNITED STATES PATENT OFFICE
CERTIFICATE OF CORRECTION

Patent No. 3,557,146    Dated January 19, 1971

Inventor(s) Richard F. Heck

It is certified that error appears in the above-identified patent and that said Letters Patent are hereby corrected as shown below:

Col. 6, line 73 of printed patent, "G.P.P." should read --g.b.p.--

Claim 1, col. 9, line 67 of printed patent, after "QM'X" should read --or QM'X$_2$-- should be inserted Col. 10, line 26 of printed patent, "-OC alkyl," should r -- -CO alkyl, --

Col. 10, line 26 of printed patent, "-NCHO alkyl," should read -- -NHCO alkyl,--

Col. 10, line 40 of printed patent, "theinyl" should read --thienyl--

Signed and sealed this 8th day of June 1971.

(SEAL)
Attest:

EDWARD M. FLETCHER, JR.
Attesting Officer

WILLIAM E. SCHUYLER,
Commissioner of Pate